United States Patent
Bharucha et al.

(10) Patent No.: US 9,071,404 B2
(45) Date of Patent: Jun. 30, 2015

(54) BASE STATION APPARATUS AND COMMUNICATION CONTROL METHOD

(75) Inventors: Zubin Bharucha, Munich (DE); Auer Gunther, Munich (DE); Tetsushi Abe, Tokyo (JP); Nobuhiko Miki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 148 days.

(21) Appl. No.: 14/001,707

(22) PCT Filed: Feb. 17, 2012

(86) PCT No.: PCT/JP2012/053835
§ 371 (c)(1),
(2), (4) Date: Nov. 11, 2013

(87) PCT Pub. No.: WO2012/117873
PCT Pub. Date: Sep. 7, 2012

(65) Prior Publication Data
US 2014/0056247 A1    Feb. 27, 2014

(30) Foreign Application Priority Data
Feb. 28, 2011    (JP) ................................. 2011-042136

(51) Int. Cl.
*H04L 5/00* (2006.01)
*H04W 74/08* (2009.01)
*H04W 84/12* (2009.01)
*H04W 72/04* (2009.01)
(Continued)

(52) U.S. Cl.
CPC ............. *H04L 5/0073* (2013.01); *H04W 74/08* (2013.01); *H04W 84/12* (2013.01); *H04W 72/04* (2013.01); *H04W 74/04* (2013.01); *H04W 28/048* (2013.01); *H04W 72/0426* (2013.01); *H04W 84/045* (2013.01)

(58) Field of Classification Search
CPC ... H04L 5/0073; H04L 43/50; H04L 43/0852; H04L 43/08; H04W 72/04; H04W 88/08; H04W 76/00; H04W 24/00; H04B 17/003
USPC .......................... 370/252, 328–329, 338, 350
See application file for complete search history.

(56) References Cited

U.S. PATENT DOCUMENTS

| 8,311,554 | B2 * | 11/2012 | Abedi | ........................... 455/454 |
| 2010/0085945 | A1 * | 4/2010 | Williams | ...................... 370/336 |

(Continued)

OTHER PUBLICATIONS

International Search Report issued in PCT/JP2012/053835 mailed on May 15, 2012 (1 page).

(Continued)

*Primary Examiner* — Warner Wong
(74) *Attorney, Agent, or Firm* — Osha Liang LLP

(57) ABSTRACT

To reduce interference that a user terminal connecting to a base station apparatus forming a large-scale cell undergoes from a base station apparatus forming a small-scale cell in a radio communication system in which the small-scale cell is provided in the large-scale cell, a femto-base station forming a femto-cell provided in a macro-cell receives cell identification information of a macro-base station, determines cell identification information of the femto-base station based on the received cell identification information of the macro-base station so as to reduce interference to a control format indicator channel assigned to radio resources by the macro-base station, and controls assignment of control channels to radio resources based on the determined cell identification information of the femto-base station.

8 Claims, 8 Drawing Sheets

M1-M3 : MACRO UE
F : FEMTO UE
MC : MACRO-CELL
FC : FEMTO-CELL
eNB : EVOLVED NodeB
HeNB : HOME EVOLVED NodeB
→ INTENDED LINK
---▶ INTERFERING LINK

(51) Int. Cl.
*H04W 74/04* (2009.01)
*H04W 28/04* (2009.01)
*H04W 84/04* (2009.01)

(56) References Cited

U.S. PATENT DOCUMENTS

2011/0110251 A1* 5/2011 Krishnamurthy et al. .... 370/252
2012/0106476 A1* 5/2012 Song et al. .................... 370/329
2013/0137447 A1* 5/2013 Zhang et al. ................ 455/452.1
2013/0229985 A1* 9/2013 Kim et al. ..................... 370/328

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

* cited by examiner

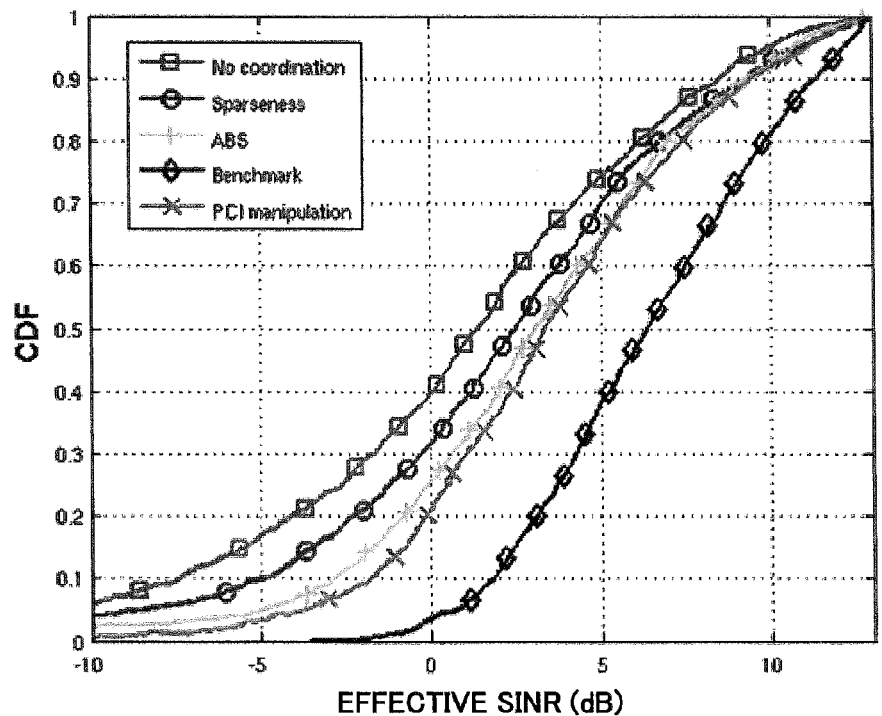

FIG. 8A

| Parameter | Value |
| --- | --- |
| Avg. dual stripes per macro-cell sector | 1 |
| Avg. macro UEs per macro-cell sector | 10 |
| Inter-site distance | 500 m |
| Individual apartment dimensions | 10 m x 10 m |
| Number of floors per stripe | 3 |
| HeNB activation probability, $p_{active}$ | 0.1 |
| Percent of macro UEs lying indoors | 80% |
| Number of REs per RB, $N_{RE}$ | 12 |
| Tot. number of available RBs, $N_{RB}^{DL}$ | 50 |
| Thermal noise density | −174 dBm/Hz |
| eNB transmit power per sector | 46 dBm |
| HeNB transmit power, $P_{max}$ | 20 dBm |
| eNB antenna gain | 14 dBi |
| Sectors per eNB | 3 |
| Min. distance between macro UE and eNB | 35 m |
| Min. distance between femto UE and HeNB | 20 cm |
| Number of HeNB/eNB Rx antennae | 2 Rx |
| Number of macro/femto UE Rx antennae | 2 Rx |
| Wall penetration loss | 20 dB |

FIG. 8B

BASE STATION APPARATUS AND COMMUNICATION CONTROL METHOD

TECHNICAL FIELD

The present invention relates to a base station apparatus and communication control method in the next-generation mobile communication system.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied (Non-patent literature 1). In LTE, as a multiplexing scheme, OFDMA (Orthogonal Frequency Division Multiple Access) different from W-CDMA is used in downlink, and SC-FDMA (Single Carrier Frequency Division Multiple Access) is used in uplink.

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. In the UMTS network, for the purpose of further increasing the wide-band and high speed, successor systems to LTE have been studied (for example, LTE Advanced (LTE-A)).

In the LTE system and LTE-A system, studied is a radio communication system in which a small-scale cell having a local coverage area is disposed in a large-scale cell having a wide-range coverage area. Such a radio communication system is also called the HetNet (Heterogeneous Network).

CITATION LIST

Non-Patent Literature

[Non-patent literature 1] 3GPP, TR25.912 (V7.1.0), "Feasibility study for Evolved UTRA and UTRAN", September 2006

SUMMARY OF THE INVENTION

Technical Problem

However, in the above-mentioned radio communication system, when a user terminal connecting to a base station apparatus forming a large-scale cell (for example, macrocell) is positioned in a small-scale cell (for example, femtocell), there is a problem that the user terminal undergoes interference from a base station apparatus forming the small-scale cell.

The present invention was made in view of such a respect, and it is an object of the invention to provide a base station apparatus and communication control method for enabling reductions in interference that a user terminal connecting to a base station apparatus forming a large-scale cell undergoes from a base station apparatus forming a small-scale cell in a radio communication system in which the small-scale cell is provided in the large-scale cell.

Solution to Problem

A base station apparatus of the invention is a base station apparatus forming a small-scale cell provided in a large-scale cell, and is characterized by having a reception section that acquires cell identification information of another base station apparatus forming the large-scale cell, a cell identification information determining section which refers to the cell identification information of the another base station apparatus, and determines cell identification information of the base station apparatus forming the small-scale cell so as to reduce interference to a control format indicator channel assigned to radio resources by the another base station apparatus, and a control signal generating section that generates a control signal to assign to the radio resources based on the cell identification information determined in the cell identification information determining section.

According to this configuration, it is possible to suppress overlapping of a control format indicator channel that the base station apparatus of the large-scale cell assigns to radio resources, and a control channel that the base station apparatus of the small-scale cell assigns to radio resources. By this means, even when a user terminal under the base station apparatus of the large-scale cell is in the small-scale cell, it is possible to reduce an effect such that the base station of the small-scale cell interferes with the user terminal, and the base station of the small-scale cell is capable of using radio resources effectively.

A communication control method of the invention is a communication control method in a base station apparatus forming a small-scale cell provided in a large-scale cell, and is characterized by having the steps of acquiring cell identification information of another base station apparatus forming the large-scale cell, determining cell identification information of the base station apparatus forming the small-scale cell so as to reduce interference to a control format indicator channel assigned to radio resources by the another base station apparatus, based on the cell identification information of the another base station apparatus, and generating a control signal to assign to the radio resources based on the determined cell identification information.

Technical Advantage of the Invention

According to the invention, in the radio communication system in which the small-scale cell is provided in the large-scale cell, it is possible to reduce interference that a user terminal connecting to the base station apparatus forming the large-scale cell undergoes from the base station apparatus forming the small-scale cell.

BRIEF DESCRIPTION OF THE DRAWINGS

FIG. 8 contains a graph and table showing simulation results in using a communication control method according to this Embodiment.

DESCRIPTION OF EMBODIMENTS

Figure 1:
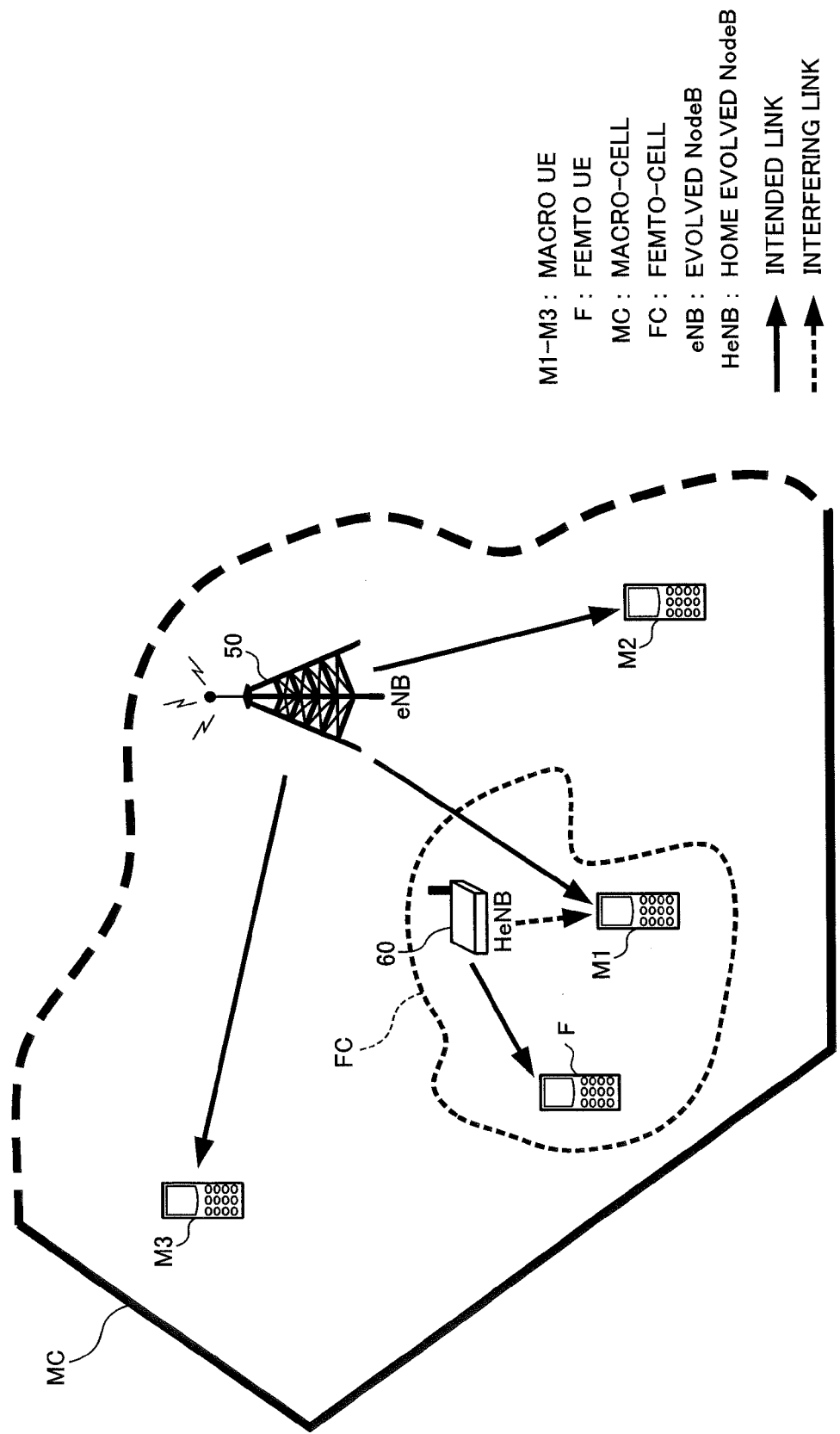
FIG. 1 is a conceptual diagram of HetNet.

FIG. 1 shows a conceptual diagram of HetNet. The HetNet is comprised of a base station apparatus (eNB: Evolved NodeB) forming a large-scale cell (macro-cell) with a large cell radius, and a base station apparatus forming a small-scale cell (micro-cell) with a relatively small cell radius. As the micro-cell, for example, there are a femto-cell provided in an indoor facility such as the home and office, a pico-cell and the like. Herein, a base station apparatus constituting the femto-cell is also called HeNB (Home Evolved NodeB).

Thus, by placing the small-scale cell (hereinafter, also described as a "femto-cell") in a predetermined area (for example, indoor facility such as the home and office) in a coverage area of the large-scale cell (hereinafter, also described as a "macro-cell") to enable a connecting destination of a user terminal to be switched corresponding to a communication environment and use, it is possible to improve radio communication service.

In the HetNet, considered is a system in which a base station apparatus 50 (hereinafter, also described as a "macro-base station") forming a macro-cell MC and a base station apparatus 60 (hereinafter, also described as a "femto-base station") forming a femto-cell FC share at least a part of the frequency band. In such a system, when a user terminal connecting to the macro-base station 50 is positioned within the coverage range of the femto-cell FC, interfering signals, which the user terminal (user terminal M1 in FIG. 1) receives from the femto-base station 60, increase. In such a case, generally, by the user terminal M1 performing handover from the macro-base station 50 to the femto-base station 60, it is possible to avoid the interfering signals received from the femto-base station 60.

Meanwhile, in the 3GPP (3rd Generation Partnership Project), as the femto-base station 60, there is a station 60 that forms a CSG (Closed Subscriber Group) that permits a particular user to gain access. For example, in FIG. 1, when the femto-base station 60 forms the CSG, the station 60 permits only an already registered user terminal F to gain access, and does not permit the user terminal M1 that is not registered in the femto-cell FC to gain access.

In this case, when the user terminal M1 that is not permitted to gain access to the femto-base station 60 moves into the femto-cell FC, the user terminal M1 is not able to perform handover from the macro-base station 50 to the femto-base station 60. Accordingly, there is a problem that the user terminal M1 undergoes an effect of interference from the femto-base station 60.

Figure 2:
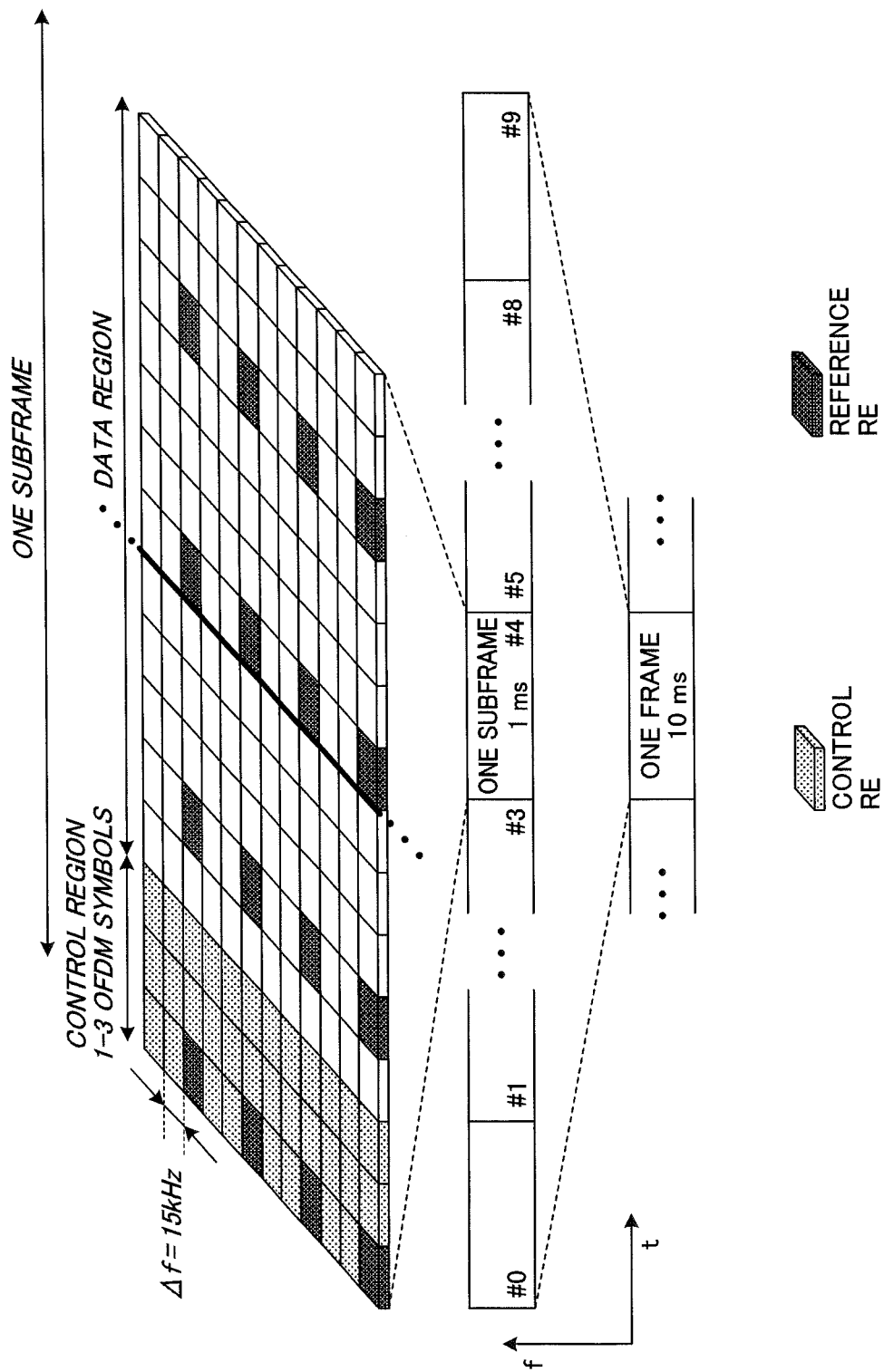
FIG. 2 is a conceptual diagram of a frame configuration in an LTE system.

FIG. 2 shows an example of a frame configuration of an LTE system. In the frame configuration as shown in FIG. 2, one frame (10 ms) is comprised of ten subframes (SF#0 to SF#9) of 1 ms. Each subframe is divided into a control region used in transmission of L1/LS control signals and a data region used in transmission of data signals.

A CRS (Common Reference Signal) that is a reference signal common to the cell is assigned to a particular region (resource element) of radio resources. The assignment position of the CRS is associated with cell identification information (cell ID (PCI: Physical Cell ID)). In other words, since the position of the CRS that is shifted in the frequency domain is determined by the cell identification information, a user terminal identifies the cell identification information of the cell in which the terminal exists, and thereby specifies an arrangement configuration of the CRS. Further, the user terminal identifies the cell identification information by a cell search.

The frequency region is comprised of maximum three OFDM symbols from the beginning of the subframe, and the number of OFDM symbols dynamically varies (one of the number of OFDM symbols of 1 to 3 is selected) for each subframe corresponding to traffic information (for example, the number of connecting users and the like).

As control channels assigned to the control region, defined are the Physical Downlink Control Channel (PDCCH) used in determination of scheduling and transmission of downlink control information (DCI) such as a power control command, Physical Hybrid-ARQ Indicator Channel (PHICH) used in notification of Hybrid-ARQ acknowledgment response to uplink transmission, and Physical Control Format Indicator Channel (PCFICH) used in notification of the number of OFDM symbols in the control region.

When resources of control channels assigned to radio resources overlap in the macro-cell MC and femto-cell FC, as described above, the user terminal M1 under the macro-base station 50 positioned in the femto-cell FC is seriously affected by interference of downlink transmission from the femto-base station 60.

Figures 3A, 3B, 3C:
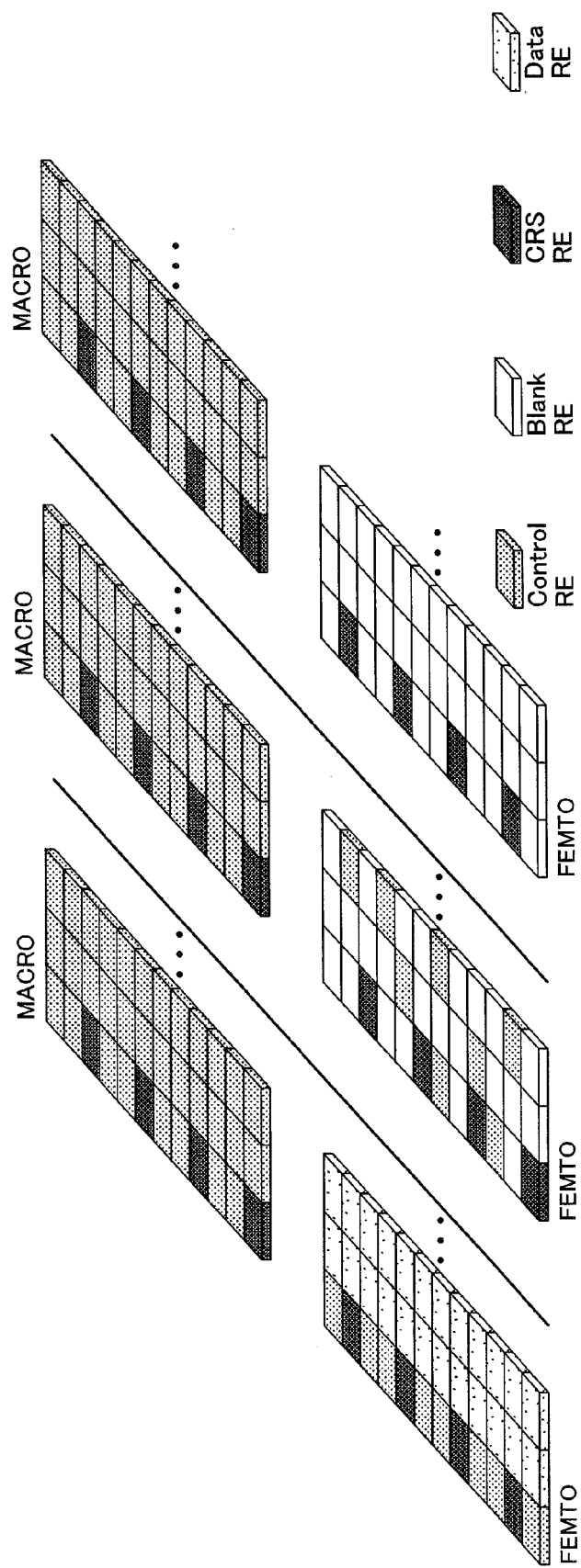
FIG. 3 contains diagrams to explain assignment resource patterns of control channels assigned by a macro-base station and a femto-base station and interference state.

Particularly, in the femto-base station 60, since the number of users connecting to the femto-base station 60 is low, the control region is comprised of the low number of OFDM symbols (for example, one OFDM symbol) from the beginning of a subframe, and the data region is configured so that the number of OFDM symbols is higher (FIG. 3A). In this case, in the first OFDM symbol of the subframe, increases a possibility of overlapping of assigned resources of the control channel in the macro-base station 50 and of the control channel in the femto-base station 60.

Therefore, in order to suppress a collision between control channel signals of the femto-base station 60 and the macro-base station 50, as shown in FIG. 3B, such a method (Femto control channel sparseness) is considered that the femto-base station 60 configures the control region using three OFDM symbols, and makes resources of the control channels sparse (reserves radio resources of the control channels more than necessary, thereby increases the number of resource elements (REs) of non-transmission, and thus decreases interference) to allocate.

As shown in FIG. 3C, such a method (Almost blank subframe) is considered that the femto-base station 60 does not perform allocation of resources for the control channel in the control region in a predetermined subframe. In this case, the femto-base station 60 assigns only the CRS to the control region, and makes the other portions blank.

However, in the method as shown in FIG. 3C, since the femto-base station 60 is not able to perform transmission of the control signal in the predetermined subframe, there is a problem that it is not possible to sufficiently make radio resources efficient. In the method as shown in FIG. 3B, although it is possible to decrease the probability of overlapping of resources to some extent by making control channel assigned resources sparse, the possibility still remains that resources of the control channel of the femto-base station 60 overlap resources of the PCFICH of the macro-base station 50.

The PCFICH is comprised of information of 2 bits indicating that the size of the control region corresponds to any of one, two and three OFDM symbols. The user terminal decodes a PCFICH signal and thereby specifies the size of the control region, and therefore, the PCFICH is always assigned to the first OFDM symbol of each subframe.

In other words, since the user terminal is not able to identify timing of starts of the control channel and data region of the subframe when decoding of the PCFICH signal is erroneous, it is important to correctly decode the PCFICH signal. As shown in FIG. 3B, even in the case of sparsing control channel assigned resources of the femto-base station, when a control channel signal of the femto-base station collides with a PCFICH signal of the macro-base station, the user terminal M1 under the macro-base station is not able to decode the PCFICH signal, and is not able to receive the other control channels and data channel signals in the subframe.

Then, the inventors of the invention focused on the Physical Control Format Indicator Channel (PCFICH) among control channels that the macro-base station assigns, and obtained the idea that the above-mentioned problem is effectively solved by allocating resources of control channels of the femto-base station so as to reduce interference to the PCFICH of the macro-base station. The inventors found out a communication control method for controlling an assignment resource pattern of control channels of the femto-base station after specifying the position of the PCFICH assigned by the macro-base station on the femto-base station side.

The inventors of the invention conceived using cell identification information (cell ID (PCI: Physical Cell ID)) of which the macro-base station notifies the user terminal, as a method for the femto-base station to specify an assignment resource pattern of PCFICHs of the macro-base station.

Figure 4C:
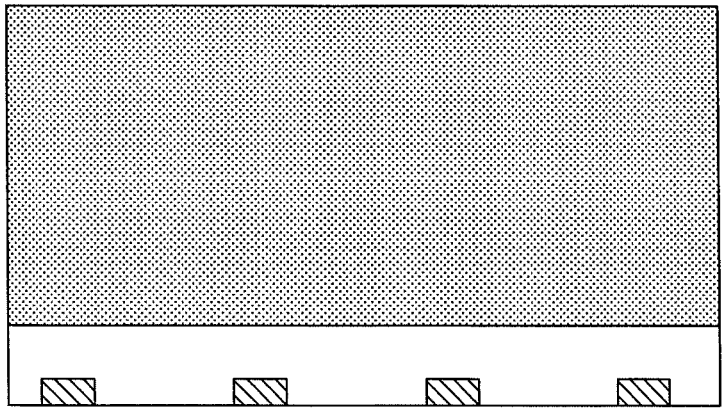
FIG. 4 contains diagrams to explain the relationship between an assignment resource pattern of PCFICHs and cell identification information.
Figure 4B:
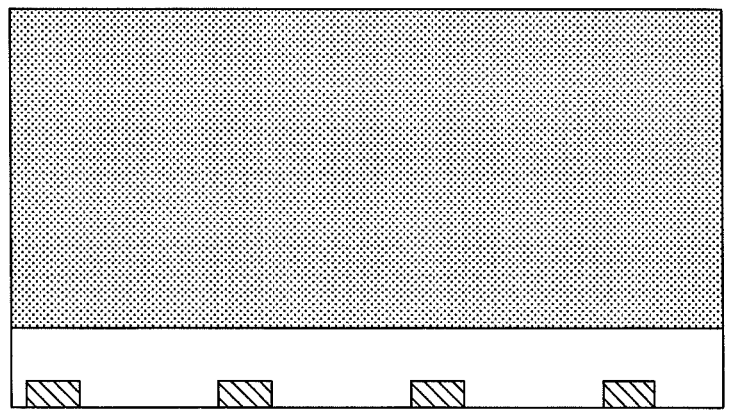
Figure 4A:
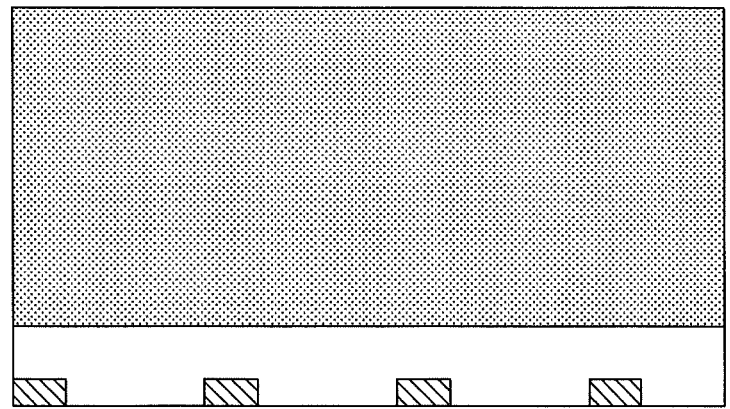

The assignment resource pattern of PCFICHs assigned to radio resources is associated with the cell identification information (cell ID (PCI: Physical Cell ID)). Generally, different cell identification information is set among adjacent macro-cells so that the PCFICH of each cell does not interfere with one another. FIGS. 4A to 4C show assignment resource patterns of PCFICHs when the cell identification information is shifted. Similarly, in the PHICH and PDCCH, assignment resource patterns to radio resources are associated with the cell identification information.

The femto-base station side obtains the cell identification information of the macro-base station, and thereby, is capable of grasping positions of PCFICH assigned resources of the macro-base station. By setting the cell identification information of the femto-base station suitably, the femto-base station is capable of allocating resources of control channels so as not to overlap PCFICH assigned resources of the macro-base station.

Then, in a communication control method of this Embodiment, cell identification information of the macro-base station is received, cell identification information of the femto-base station is determined based on the received cell identification information of the macro-base station so as to reduce interference to a control format indicator channel assigned to radio resources by the macro-base station, and a control signal to assign to radio resources is generated based on the determined cell identification information of the femto-base station.

Figures 5A, 5B:
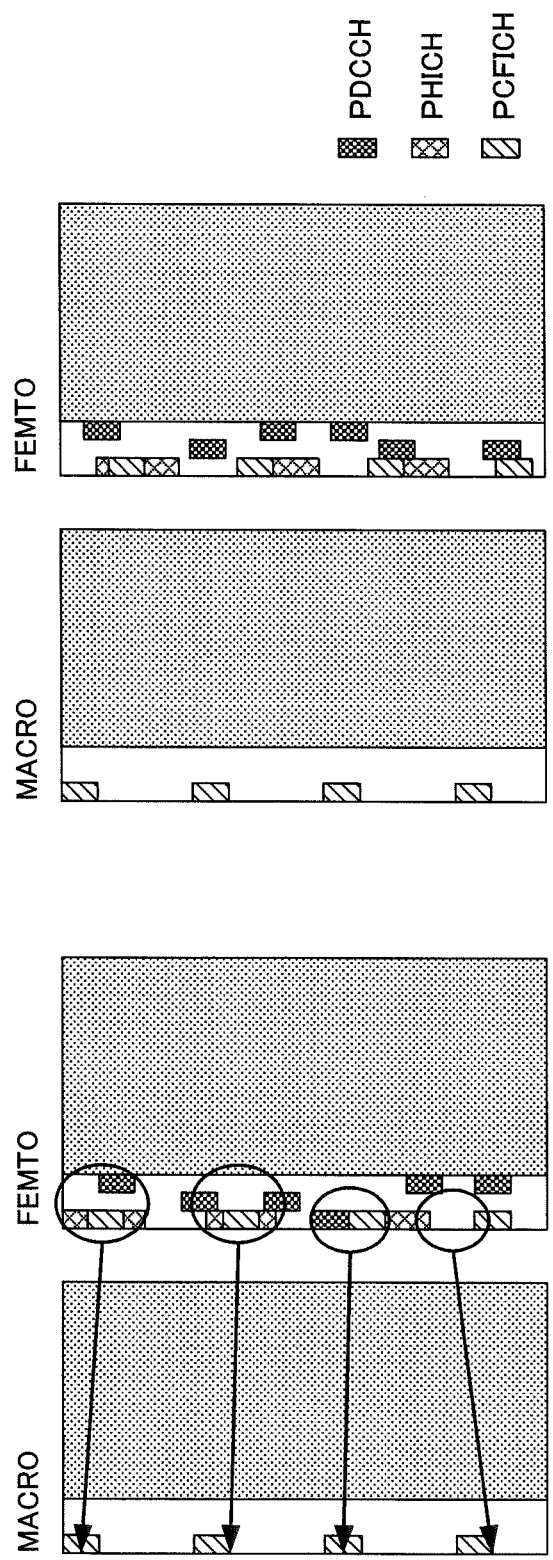
FIG. 5 contains diagrams to explain assignment resource patterns of control channels of conventional technique and a femto-base station according to this Embodiment.

FIG. 5A shows the case (for example, FIG. 3B as described above) where the femto-base station allocates resources of control channels without considering the cell identification information of the macro-base station. In this case, since resources of control channels assigned by the femto-base station are associated with the cell identification information of the femto-base station, even in the case of making control channel assigned resources sparse, there is a case of colliding with PCFICH assigned resources of the macro-base station.

FIG. 5B shows a case of applying the communication control method shown in this Embodiment. In this case, the femto-base station performs resource allocation of control channels based on the identification information determined while considering the assignment resource pattern of PCFICHs of the macro-base station. Accordingly, it is possible to effectively decrease the rate that the PCFICH of the macro-base station overlaps control channel assigned resources of the femto-base station. As a result, even in the case where the user terminal under the macro-base station moves to the inside of the femto-cell, it is possible to suppress interference from the femto-base station when the user terminal under the macro-base station receives a PCFICH signal, and the femto-base station is capable of effectively using radio resources.

Figure 6:
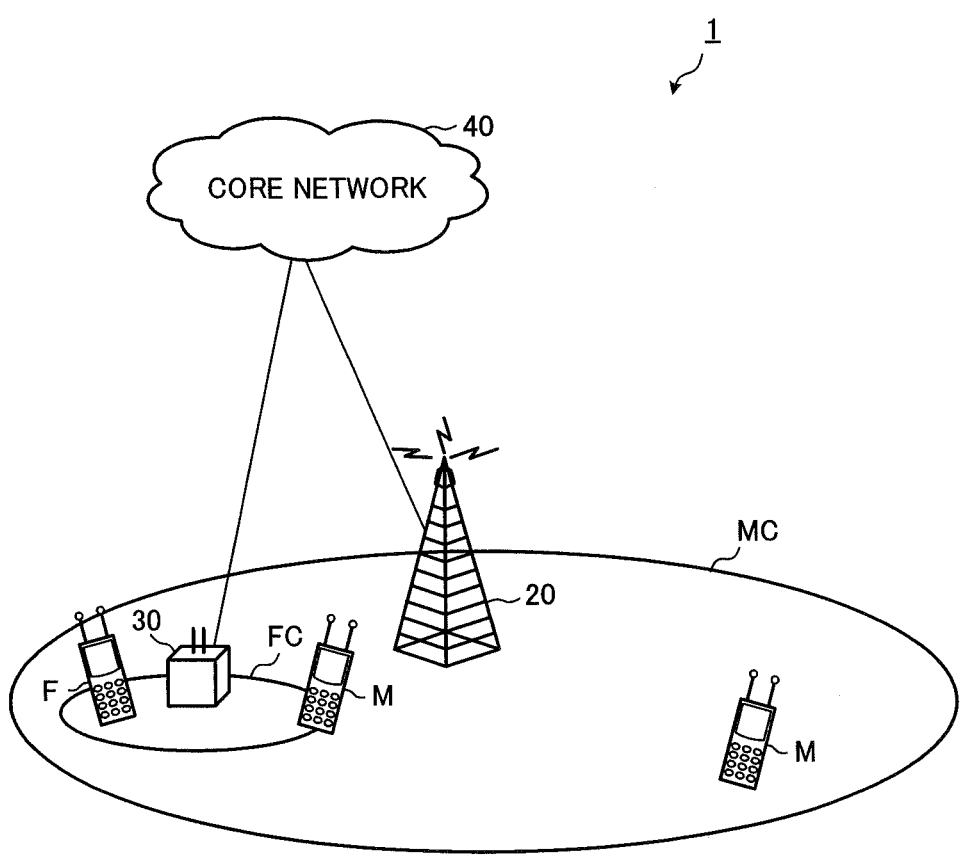
FIG. 6 is an explanatory view of a configuration of a radio communication system.

A configuration of the base station apparatus of this Embodiment will be specifically described below. FIG. 6 is an explanatory view of a system configuration of a radio communication system according to this Embodiment. In addition, the radio communication system as shown in FIG. 6 is a system including an LTE system or SUPER 3G, for example. Further, this radio communication system may be called IMT-Advanced or may be called 4G.

The radio communication system as shown in FIG. 6 is a system using the HetNet. Hereinafter, in the radio communication system, described is an example of using a femto-cell as a small-scale cell having a local coverage area. However, the small-scale cell is not limited particularly, as long as the cell is a cell having another local coverage such as a pico-cell. Herein, described are a macro-base station forming a large-scale cell and a micro-base station forming a small-scale cell, and the present invention is also applicable to a first transmission point (first base station apparatus) forming a first cell and a second transmission point (second base station apparatus) forming a second cell that has a possibility of mutually interfering with the first cell.

As shown in FIG. 6, the radio communication system 1 includes user terminals, macro-base station 20 forming a macro-cell MC, and femto-base station 30 forming a femto-cell FC in the macro-cell MC. A user terminal F is connected to the femto-base station 30. A user terminal M in the femto-cell FC is connected to the macro-base station 20, and is not connected to the femto-base station 30.

The macro-base station 20 and femto-base station 30 are connected to a core network 40, and communicate with an upper station apparatus (for example, MME (Mobility Management Entity), gateway apparatus and the like) provided on the core network 40. In the macro-base station 20 and femto-base station 30, a scheduler allocates radio resources on a resource-block-by-resource-block basis for each user terminal.

In the radio communication system 1, as a radio access scheme, OFDMA (Orthogonal Frequency Division Multiple Access) is applied in downlink, and SC-FDMA (Single Carrier-Frequency Division Multiple Access) is applied in uplink. OFDMA is a multicarrier transmission scheme for dividing a frequency band into a plurality of narrow frequency bands (subcarriers) and mapping data to each subcarrier to perform communications. SC-FDMA is a single-carrier transmission scheme for dividing a system band into bands comprised of one or consecutive resource blocks for each terminal, and by a plurality of terminals using mutually different bands, reducing interference among the terminals. However, the radio access scheme is not particularly limited.

Herein, described are communication channels applied in the radio communication system 1. Downlink communication channels have the PDSCH as a downlink data channel shared among user terminals, downlink L1/L2 control channels (PDCCH, PCFICH, PHICH), broadcast channels (BCH) and the like. User data and higher control information is transmitted on the PDSCH. Scheduling information of PDSCH and PUSCH and the like is transmitted on the PDCCH. The number of OFDM symbols used in the PDCCH is transmitted on the PCFICH, and ACK/NACK of HARQ (Hybrid Automatic Repeat Request) to the PUSCH is transmitted on the PHICH.

Uplink communication channels have the PUSCH (Physical Uplink Shared Channel) as an uplink data channel shared among user terminals, PUCCH (Physical Uplink Control Channel) that is an uplink control channel and the like. User data and higher control information is transmitted on the PUSCH. Further, downlink radio quality information, ACK/NACK and the like is transmitted on the PUCCH.

Figure 7:
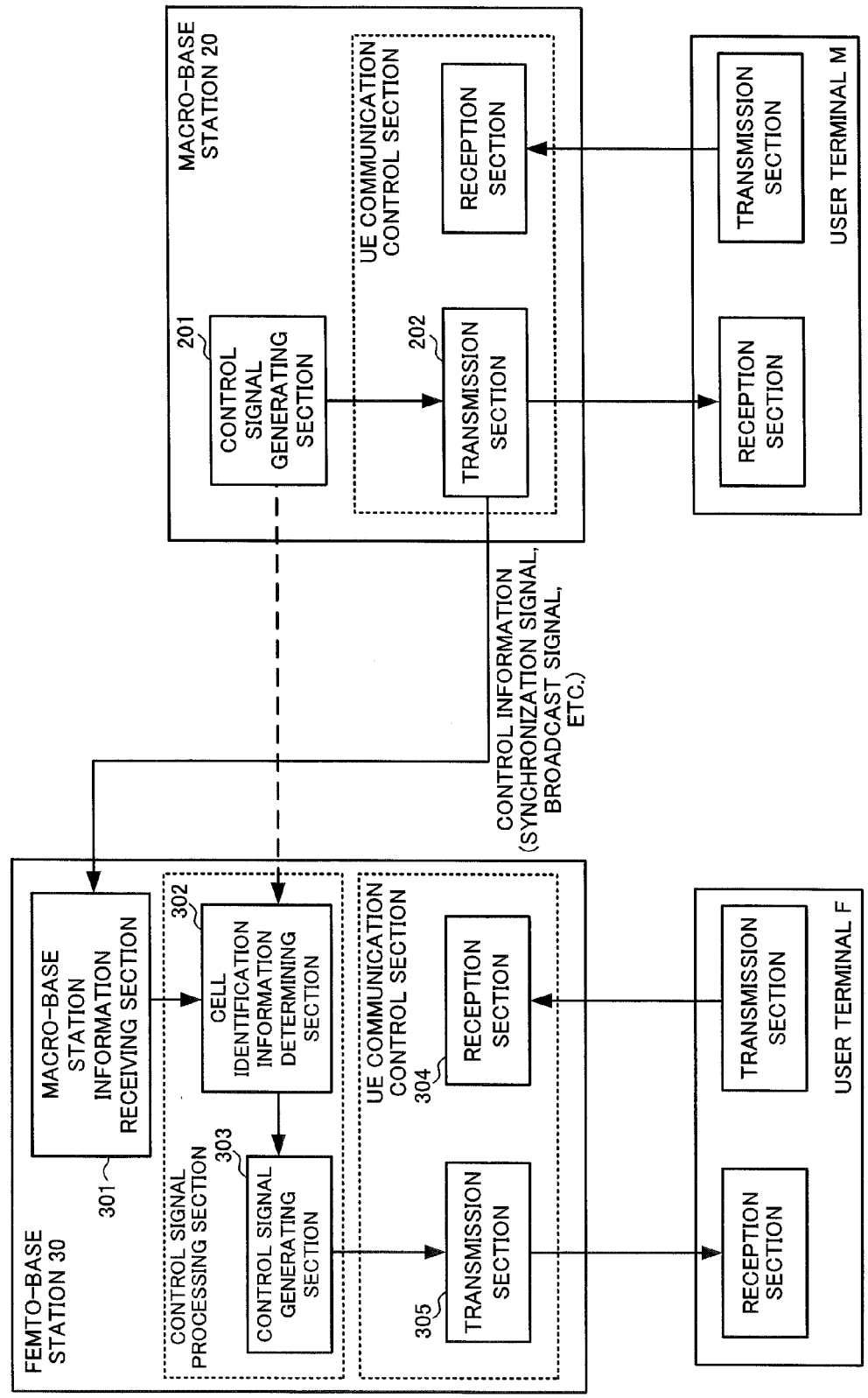
FIG. 7 is a diagram showing an example of functional block diagrams of base station apparatuses.

FIG. 7 is a schematic configuration diagram of the femto-base station 30, macro-base station 20 and user terminals respectively belonging to the base stations. In FIG. 7, each base station and user terminals have all functions required for radio communications in addition to the configuration as shown in the figure.

As shown in FIG. 7, as a functional configuration for reducing interference to the user terminal M under the macro-base station 20, the femto-base station 30 has at least a macro-base station information receiving section 301, cell identification information determining section 302, and control signal generating section 303.

The macro-base station information receiving section 301 acquires cell identification information of the macro-base station 20, based on control information (synchronization signal, broadcast signal, etc.) transmitted from a transmission section 202 of the macro-base station 20. For example, the macro-base station information receiving section 301 performs a cell search using a synchronization channel signal (primary synchronization signal (PSS), secondary synchronization signal (SSS)) transmitted from the macro-base station 20, and is thereby capable of acquiring the cell identification information of the macro-base station 20.

In this case, the macro-base station information receiving section 301 identifies identifiers (3: 0~2) in a cell ID group using the PSS, detects the cell ID group (168: 0~167) using the SSS, and thereby determines the cell identification information of the macro-base station 20. In other words, the macro-base station information receiving section 301 is capable of performing by the same method as the method for the user terminal M under the macro-base station 20 to determine the cell identification information.

Timing at which the macro-base station information receiving section 301 acquires the cell identification information of the macro-base station 20 is set as appropriate corresponding to an installation place, use and the like. For example, the section 301 is configured to acquire the cell identification information of the macro-base station 20 by the same procedure as the user terminal M under the macro-base station 20 at the time of startup of the femto-base station 30. The macro-base station information receiving section 301 is started at predetermined intervals, and may perform a cell search to acquire the identification information of the macro-base station 20.

When the femto-base station 30 acquires the cell identification information of the macro-base station 20 using radio communications, it is possible to configure the femto-base station 30 provided with the macro-base station information receiving section 301 independently of a reception section 304 that receives a signal transmitted from the user terminal F under the station 30. It is also possible to configure the femto-base station 30 to acquire the cell identification information from the macro-base station 20 using wired communications (backhaul link) from the macro-base station 20. In this case, a control signal generating section 201 of the macro-base station 20 notifies the cell identification information determining section 302 of the femto-base station 30 of the cell identification information of the macro-base station 20 (dotted-line arrow in FIG. 7).

The cell identification information determining section 302 determines cell identification information of the cell (femto-base station 30), based on the cell identification information of the macro-base station 20 acquired in the macro-base station information receiving section 301.

More specifically, first, the section 302 grasps an assignment resource pattern of PCFICHs assigned to radio resources by the macro-base station 20, from the obtained cell identification information of the macro-base station 20. Then, the section 302 determines the cell identification information of the femto-base station 30 so as to decrease the rate that resources of control channels assigned by the femto-base station 30 overlap the assignment resource pattern of PCFICHs of the macro-base station 20 and suppress interference to the PCFICHs of the macro-base station 20. By this means, when the user terminal receives the PCFICH signal, it is possible to suppress interference from the femto-base station 30.

For example, the cell identification information determining section 302 selects cell identification information that decreases the rate (to a predetermined value or less) that the assignment resource pattern of control channels overlaps the assignment resource pattern of PCFICHs of the macro-base station, from among a plurality of pieces of cell identification information (for example, 504 cell IDs) beforehand associated with assignment resource patterns of control channels. In selecting the cell identification information, the condition (predetermined value) of the rate, such that the assignment resource pattern of control channels of the femto-base station overlaps the assignment resource pattern of PCFICHs of the macro-base station, is set as appropriate corresponding to the use, the number of users and the like. As an example, it is possible to select cell identification information such that the assignment resource pattern of PCFICHs of the macro-base station 20 least overlaps the assignment resource pattern of control channels.

The cell identification information determining section 302 may determine a cell identification number while preferentially considering an assignment resource pattern of particular control channels (any one of the PDCCH, PCFICH and PHICH). For example, when there is a plurality of pieces of cell identification information that decreases the rate, to a predetermined value or less, such that the assignment resource pattern of control channels overlaps the assignment resource pattern of PCFICHs of the macro-base station 20, it is possible to determine the cell identification information by preferentially considering the PCFICH of the femto-base station 30. In this case, the cell identification information determining section 302 selects cell identification information having an assignment resource pattern in which the PCFICH of the macro-base station 20 and the PCFICH of the femto-base station 30 do not overlap each other. When there is a plurality of pieces of cell identification information having the assignment resource pattern in which the PCFICH of the macro-base station 20 and the PCFICH of the femto-base station 30 do not overlap each other, the section 302 may select cell identification information having an assignment resource pattern in which the PCFICH of the macro-base station 20 and the PHICH of the femto-base station 30 do not overlap each other.

Moreover, the cell identification information determining section 302 may determine a cell identification number of the femto-base station 30 by considering an assignment resource pattern of CRSs such that the assignment resource pattern is associated with the cell identification information.

The control signal generating section 303 generates control signals assigned to radio resources, based on the cell identification information of the femto-base station 30 determined in the cell identification information determining section 302. The control signals generated in control signal generating section 303 are transmitted to the user terminal F under the femto-base station 30 from a transmission section 305.

By thus applying the femto-base station 30 as shown in this Embodiment, it is possible to effectively decrease the rate of overlapping of resources of PCFICHs assigned to radio resources by the macro-base station 20 and resources of control channels assigned to radio resources by the femto-base station 30. As a result, even in the case where the user terminal M under the macro-base station 20 moves to the inside of the femto-cell, it is possible to suppress interference from the femto-base station when the user terminal receives a PCFICH signal, and the femto-base station 30 is capable of effectively using radio resources.

FIG. 8 shows simulation results in using the communication control method in this Embodiment. FIG. 8A shows the relationship between the effective SINR of the user terminal under the macro-base station and the Cumulative Distribution Function (CDF). FIG. 8B shows conditions of simulations.

From the results of FIG. 8, in the case (PCI manipulation) of applying the communication control method of this Embodiment, it is verified that the reception quality of the user terminal under the macro-base station positioned in the femto-base station is improved, as compared with the case (No coordination) without any consideration given to control channels, the case (Sparseness) where the femto-base station configures the control region using three OFDM symbols, and makes control channels sparse to assign, and the like.

In the above-mentioned Embodiment, the femto-cell is described as a small-scale cell, but the invention is not limited to this configuration. It is essential only that the base station apparatus that covers a small-scale is capable of constructing the Heterogeneous Network together with the macro-cell, and such a base station apparatus may be a base station apparatus that covers a pico-cell, micro-cell and the like.

The present invention is not limited to the above-mentioned Embodiment, and is capable of being carried into practice with various modifications thereof. For example, without departing from the scope of the invention, the number of processing sections and processing procedures in the above-mentioned description are capable of being carried into practice with modifications thereof as appropriate. Moreover, the invention is capable of being carried into practice with modifications thereof as appropriate without departing from the scope of the invention.

The present application is based on Japanese Patent Application No. 2011-042136 filed on Feb. 28, 2011, entire content of which is expressly incorporated by reference herein.

The invention claimed is:

1. A base station apparatus forming a small-scale cell provided in a large-scale cell, comprising:
a reception section that acquires cell identification information of another base station apparatus forming the large-scale cell;
a cell identification information determining section which refers to the cell identification information of the another base station apparatus, and determines cell identification information of the base station apparatus forming the small-scale cell so as to reduce interference to a control format indicator channel assigned to radio resources by the another base station apparatus; and
a control signal generating section that generates a control signal to assign to the radio resources based on the cell identification information determined in the cell identification information determining section.

2. The base station apparatus according to claim 1, wherein the cell identification information determining section selects cell identification information such that a rate of overlapping of an assignment resource pattern of the control format indicator channel of the another base station apparatus and an assignment resource pattern of a control channel is a predetermined value or less from among a plurality of pieces of cell identification information associated with assignment resource patterns of the control channel.

3. The base station apparatus according to claim 2, wherein the cell identification information determining section selects cell identification information such that the assignment resource pattern of the control format indicator channel of the another base station apparatus does not overlap an assignment resource pattern of a control format indicator channel of the base station apparatus forming the small-scale cell.

4. The base station apparatus according to claim 3, wherein the cell identification information determining section selects cell identification information such that the assignment resource pattern of the control format indicator channel of the another base station apparatus does not overlap an assignment resource pattern of a Hybrid-ARQ indicator channel of the base station apparatus forming the small-scale cell.

5. The base station apparatus according to claim 1, wherein the reception section acquires the cell identification information of the another base station apparatus by a cell search using a synchronization signal notified from the another base station apparatus.

6. The base station apparatus according to claim 1, wherein the cell identification information determining section acquires the cell identification information of the another base station apparatus by wired communications from the another base station apparatus.

7. The base station apparatus according to claim 1, wherein the small-scale cell is a closed cell that allows a particular user terminal to connect thereto.

8. A communication control method in a base station apparatus forming a small-scale cell provided in a large-scale cell, comprising:
acquiring cell identification information of another base station apparatus forming the large-scale cell;
determining cell identification information of the base station apparatus forming the small-scale cell so as to reduce interference to a control format indicator channel assigned to radio resources by the another base station apparatus, based on the cell identification information of the another base station apparatus; and generating a control signal to assign to the radio resources based on the determined cell identification information.

\* \* \* \* \*